United States Patent
Brown

(10) Patent No.: US 7,503,764 B2
(45) Date of Patent: Mar. 17, 2009

(54) MANICURE TRAINING DEVICE

(76) Inventor: Sandra Reid Brown, 21020 Penmar Dr., Petersburg, VA (US) 23803

(*) Notice: Subject to any disclaimer, the term of this patent is extended or adjusted under 35 U.S.C. 154(b) by 381 days.

(21) Appl. No.: 11/356,343

(22) Filed: Feb. 16, 2006

(65) Prior Publication Data

US 2006/0281054 A1     Dec. 14, 2006

Related U.S. Application Data

(60) Provisional application No. 60/689,684, filed on Jun. 10, 2005.

(51) Int. Cl.
*G09B 19/00*     (2006.01)
(52) U.S. Cl. ...................................... 434/100
(58) Field of Classification Search .................. 434/99, 434/100, 267, 295, 296; 446/320, 321
See application file for complete search history.

(56) References Cited

U.S. PATENT DOCUMENTS

| | | | | |
|---|---|---|---|---|
| 2,017,538 A | * | 10/1935 | Kaparin | ...................... 434/100 |
| 2,223,842 A | * | 12/1940 | Brekke | ........................ 434/100 |
| 2,393,371 A | * | 1/1946 | Harris | ......................... 434/100 |
| 3,691,679 A | * | 9/1972 | Kersten | ....................... 446/320 |
| 4,403,442 A | | 9/1983 | Blanco et al. | |
| 4,466,800 A | * | 8/1984 | Breiden | ....................... 434/267 |
| 4,661,187 A | | 4/1987 | Beasley | |
| 4,685,929 A | * | 8/1987 | Monestier | ...................... 623/64 |
| 5,398,704 A | * | 3/1995 | Dombeck | ..................... 132/285 |
| 5,779,483 A | * | 7/1998 | Cho | ............................. 434/262 |
| 5,853,293 A | * | 12/1998 | Weber et al. | ................. 434/262 |
| 5,904,149 A | * | 5/1999 | Ruhl et al. | ..................... 132/73 |
| 6,488,506 B2 | * | 12/2002 | Grace et al. | .................. 434/100 |

* cited by examiner

*Primary Examiner*—Kurt Fernstrom
(74) *Attorney, Agent, or Firm*—Dennis W. Jones

(57) ABSTRACT

An artificial hand assembly for use in training manicurists has a base upon which the hand is mounted at an upwardly extending angle thereto. The hand has removable fingertips having artificial nails therein. In one embodiment the hand is movable with respect to the base about one axis. In another embodiment of the invention, the hand is movable with respect to the base about two axes normal to each other. In still another embodiment the hand is movable with respect to the base in any desired direction or orientation without regard to any discrete axis, by means of a ball and socket connection to the base.

15 Claims, 4 Drawing Sheets

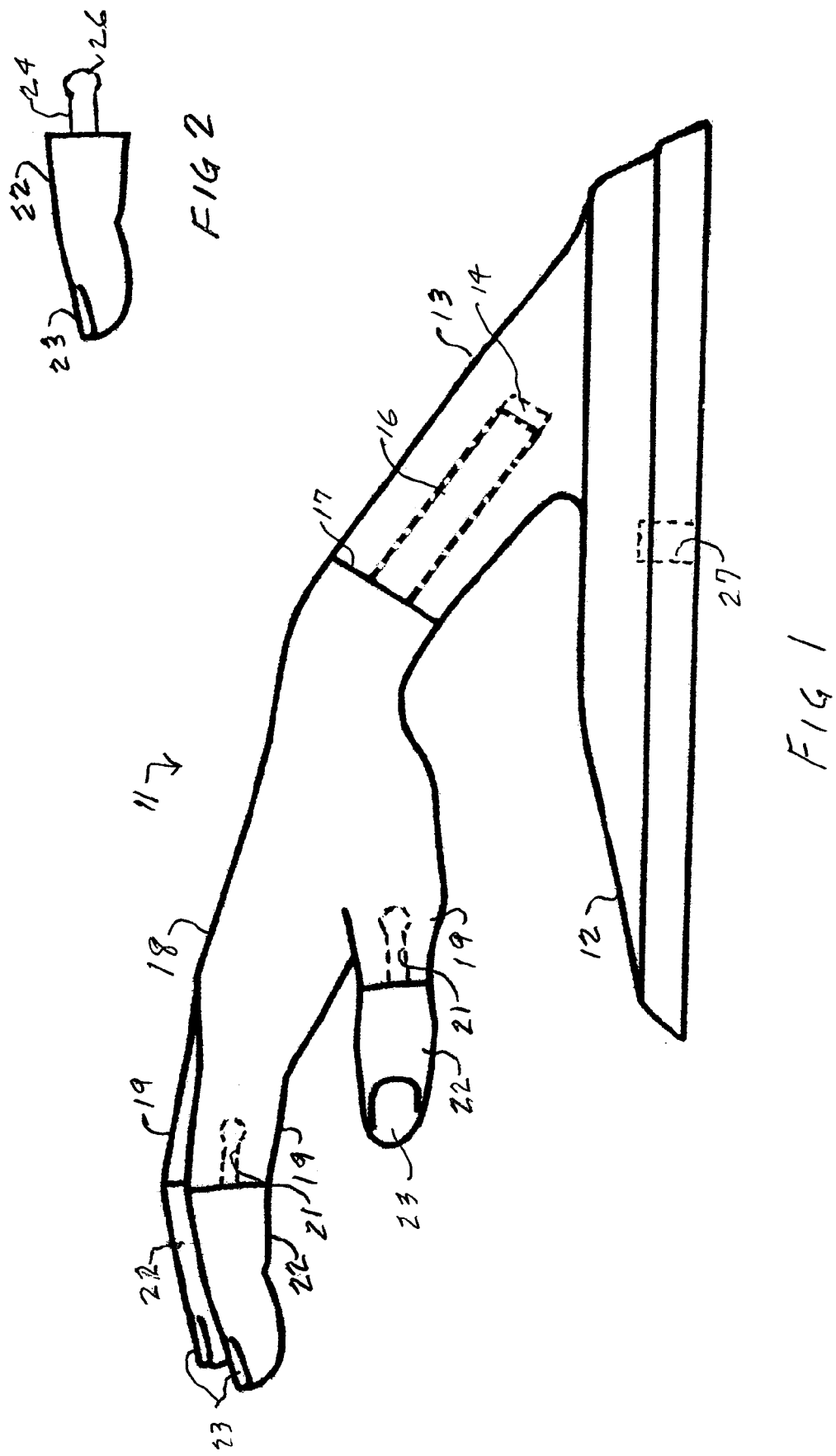

MANICURE TRAINING DEVICE

RELATED APPLICATIONS

This application is related to U.S. patent application Ser. No. 09/002,120, filed Dec. 31, 1997, now abandoned and to Provisional Application Ser. No. 60/689,684, filed Jun. 10, 2005, through which priority is claimed for the present application.

FIELD OF THE INVENTION

This invention relates to an artificial hand for enabling student manicurists, for example, to practice manicuring techniques.

BACKGROUND OF THE INVENTION

Artificial hands are commonly used as prosthetic devices which may be made from molded plastic material, such as polyurethane, polyvinyl chloride, or molded foam rubber. For realistic appearance, dyes or other coloring material may impart the desired flesh tones. Artificial hands are also used in dolls or other models of humans. In these, as in other artificial hands for whatever purpose, the finger nails may comprise synthetic polymers or elastomers which can be made to resemble closely real finger nails. Another area in which artificial hands or feet are of considerable utility is the medical training field, one such example being shown in U.S. Pat. No. 5,853,293 of Weber, et al., which discloses an artificial or model foot to which various facsimiles of foot conditions may be removably attached. In addition, artificial toenails can be added or removed. The foot may comprise a polyurethane foam, foam rubber, or a fiber filled latex material. The nails may be made of a suitable elastomeric material.

In U.S. Pat. No. 4,403,442 of Blanc et al, there is shown an artificial doll's hand having extendable fingernails which are made of synthetic polymers which are similar to human cutaneous material. The doll's fingernails (and toe nails) may be manicured and painted and, when desired, pulled out and cut off, thereby exposing new un-manicured nails. A similar arrangement is shown in U.S. Pat. No. 3,691,679 of Kersten.

U.S. Pat. No. 4,661,187 of Beasley shows a prosthetic device, such as a finger having replaceable fingernails made of suitable acrylic material.

In the foregoing prior art arrangements, a realistic hand or other appendage is, especially in the case of prosthetic devices, highly desirable. Thus the device is preferably made of a material that imitates the human hand or foot in pliability and tint. Also, where nails are part of the device, acrylic materials can be made to achieve the desired similarity to human nails. An artificial hand for use as a training device instead of as a doll's hand or as a prosthetic device seems to be lacking in the prior art. Such a training device would be highly desirable for teaching student manicurists, for example.

SUMMARY OF THE INVENTION

The present invention is a training device for use, primarily, by student manicurists, and comprises an artificial hand mounted on a secure base. In one embodiment of the invention, the fingertips which have a fingernail on their distal ends of each finger of the hand are removable so that they can be replaced by new finger tips. The finger tips themselves which, preferably, extend from the first knuckle of the finger, are held in place on the hand by a pin or rod having a slightly enlarged end, which is insertable in a bore in the fingertip. The insertion of the enlarged end is made possible by the resiliency of the hand itself which is made, preferably, from molded foam rubber or suitable plastic material having a degree of resiliency, such as a polyurethane material.

The hand itself is mounted on a holding member extending at an angle from the base and the hand has a rod end extending from the wrist insertable in a bore in the end of the holding member. In this manner, the hand is firmly held at an angular position which corresponds to the angle of an actual hand upon which a manicurist is working.

In another embodiment of the invention, a bracket member is mounted to the base and holds an end portion of the wrist of the hand which is pivotably mounted thereon. In this arrangement, the hand can be raised or lowered to accommodate the student manicurist, allowing the student to position the hand in a position that is most comfortable for her or him, while working on the hand.

In still another embodiment of the invention, the hand is joined to the base by a ball and socket joint, that permits the operator to position the hand in any desired orientation. The joint can be locked to hold the hand in a desired position, or, in its unlocked state, the operator can move the hand from position to position, as would be the case if the operator was working on a human hand.

In all of the foregoing embodiments, the base upon which the hand is mounted is preferably sturdy enough to withstand any movement of the hand without slipping or tilting. The base may also have a bore, preferably threaded, on its bottom side to permit mounting on a photographer's tripod, thus steadying the base and permitting the operator to stand while working on the hand. The various features and advantages of the present invention will be readily apparent from the following detailed description, read in conjunction with the accompanying drawings.

DESCRIPTION OF THE DRAWINGS

FIG. 1 is a side elevation view of a first embodiment of the invention;

FIG. 2 is a detail of a part of the assembly of FIG. 1;

DETAILED DESCRIPTION

Figure 3:
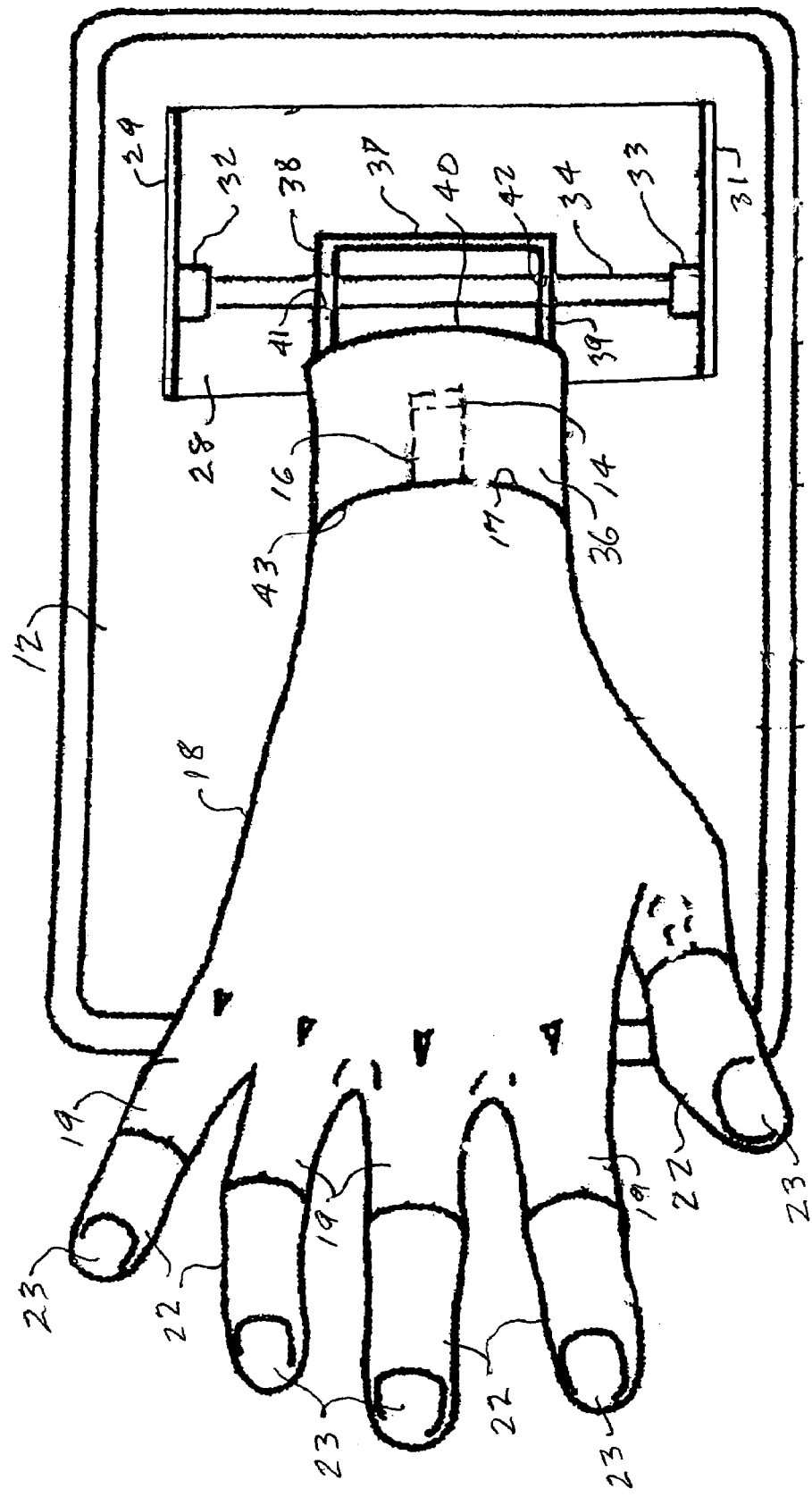
FIG. 3 is a plan view of another embodiment of the invention.

In FIG. 1 there is shown a basic assembly 11 of the present invention which comprises a base member 12 and a holding member 13 extending at an angle from the base. Base 12 and member 13 may be made from any of a number of materials such as wood, metal, or molded hard plastic, and the base is preferably weighted to prevent accidental movement of the assembly when in use. Member 13 has a bore 14 therein which receives, in a loose slip fit a pin or rod 16 which extends from the wrist end 17 of an artificial hand 18. Hand 18 is preferably made of a fairly resilient material to approximate the resiliency of the human hand. Such material may be a polyurethane, polyvinyl chloride, or molded foam rubber. In practice, it has been found that molded foam rubber having a relatively smooth outer surface to approximate human skin works quite well.

Hand 18 has partial fingers 19, only three of which are shown, each partial finger 19 having a bore 21 therein extending from its distal end into the partial finger as shown. Fingertips 22 have fingernails 23 at their distal ends which are made of suitable material, such as an acrylic material. Each of the fingertips 22 has extending therefrom a pin 24 having an enlarged end 26, as best seen in FIG. 2, which is insertable into the bore 21. The enlarged end 26 forces the resilient walls of the bore 21 to expand and thus, when seated, insures a connection that resists any relative movement between the partial finger 19 and the fingertip 22. On the other hand, fingertip 22 is readily removable from partial finger 19 upon exertion of a strong pull. Base member 12 may have a threaded bore 27 extending into the base from the bottom surface thereof from mounting assembly 11 on a tripod (not shown) such as a photographer's tripod, thus allowing the operator or student manicurist to practice manicuring while standing.

In practice, there may be a large supply of fingertips 22, and they are preferably numbered to match numbered partial fingers 19. Thus, for example, the thumb fingertip and partial finger will bear the same identifying member, as will the remaining fingertips and partial fingers. The fingernails 23 may be cleaned after use, or they may be replaced by new fingernails. Also, the fingernails may be overly long to allow the operator to practice trimming the nails to a desired length. In the prior art there are shown ways to replace fingernails on artificial hands.

The hand 18 in the assembly of FIG. 1 may be rotated by rotation of the pin 16 within the bore 14 of holder 13. The degree of slip fit of the pin within the bore governs the ease with which the hand may be rotated. The hand 18 thus is rotatable along the axis of the pin 16 and bore 14.

It is to be understood that the relationship of the bore 21 and pin 24 may be reversed, with the pin 24 extending from partial finger 19 into a bore 21 in the fingertip 22 this is true also of bore 14 and pin 16.

Figure 4:
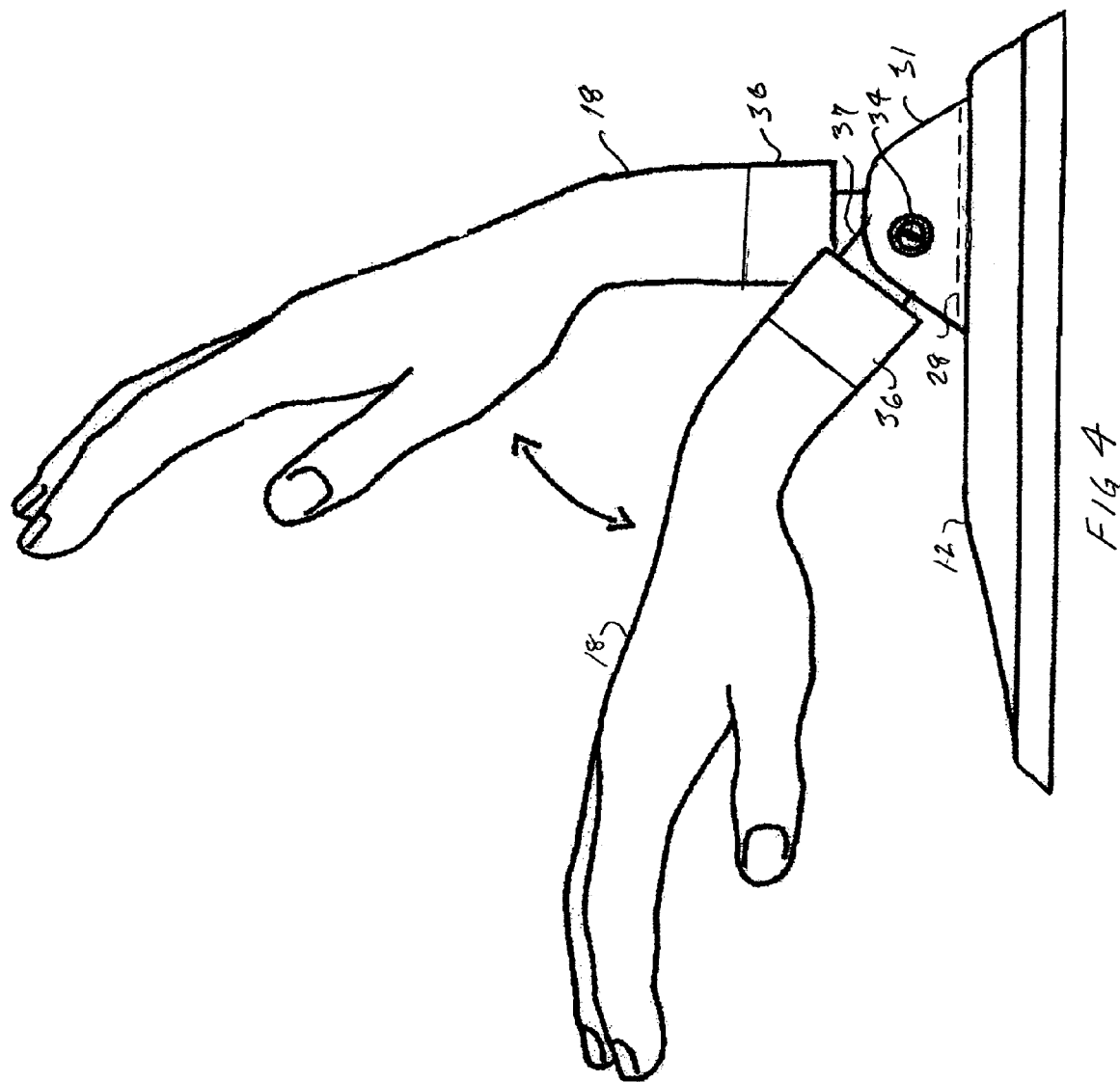
FIG. 4 is an elevation view of the assembly of FIG. 3 illustrating the operation thereof.

FIG. 3 depicts an embodiment of the invention in which the hand may be raised or lowered as depicted in FIG. 4, by being rotated along an axis that is normal to the axis of pin 16 and bore 14. For simplicity, like parts bear the same reference numerals throughout the several views.

The embodiment of FIG. 3 has a bracket 28 mounted on, or otherwise, secured to, base 12. The bracket 28 is a holding member for the hand 18, replacing member 13 of FIG. 1, and permitting the hand 18 to be oriented at a desired angle. Locking means, not shown, can be used to fix the hand at the selected angle, but such means is not strictly necessary since movement of the hand (unlocked) more nearly approximates that of the human hand. Bracket 28 has first and second upstanding ears 29 and 31 having bushings 32 and 33 for holding a horizontally extending pin 34. It is to be understood that instead of a single bracket as depicted, the upstanding ears 29 and 31 can be affixed directly to base 12. A wrist section 36 has a bracket 37 extending from the rear 40 thereof and having first and second spaced arms 38 and 39 having aligned bores 41 and 42 through which pin 34 extends, as shown. Thus section 36 is pivotable along the axis formed by pin 34, and can be raised or lowered but is otherwise fixed as best seen in FIG. 4. The front end 43 of section 36 has a bore 14 extending therefrom into the interior of section 36. The rear end 17 of hand 18 has a pin 16 extending into bore 14 in a slip fit, in the same manner as the embodiment of FIG. 1 to allow hand 18 to be rotated along the axis of pin 16 and bore 14.

Figure 5:
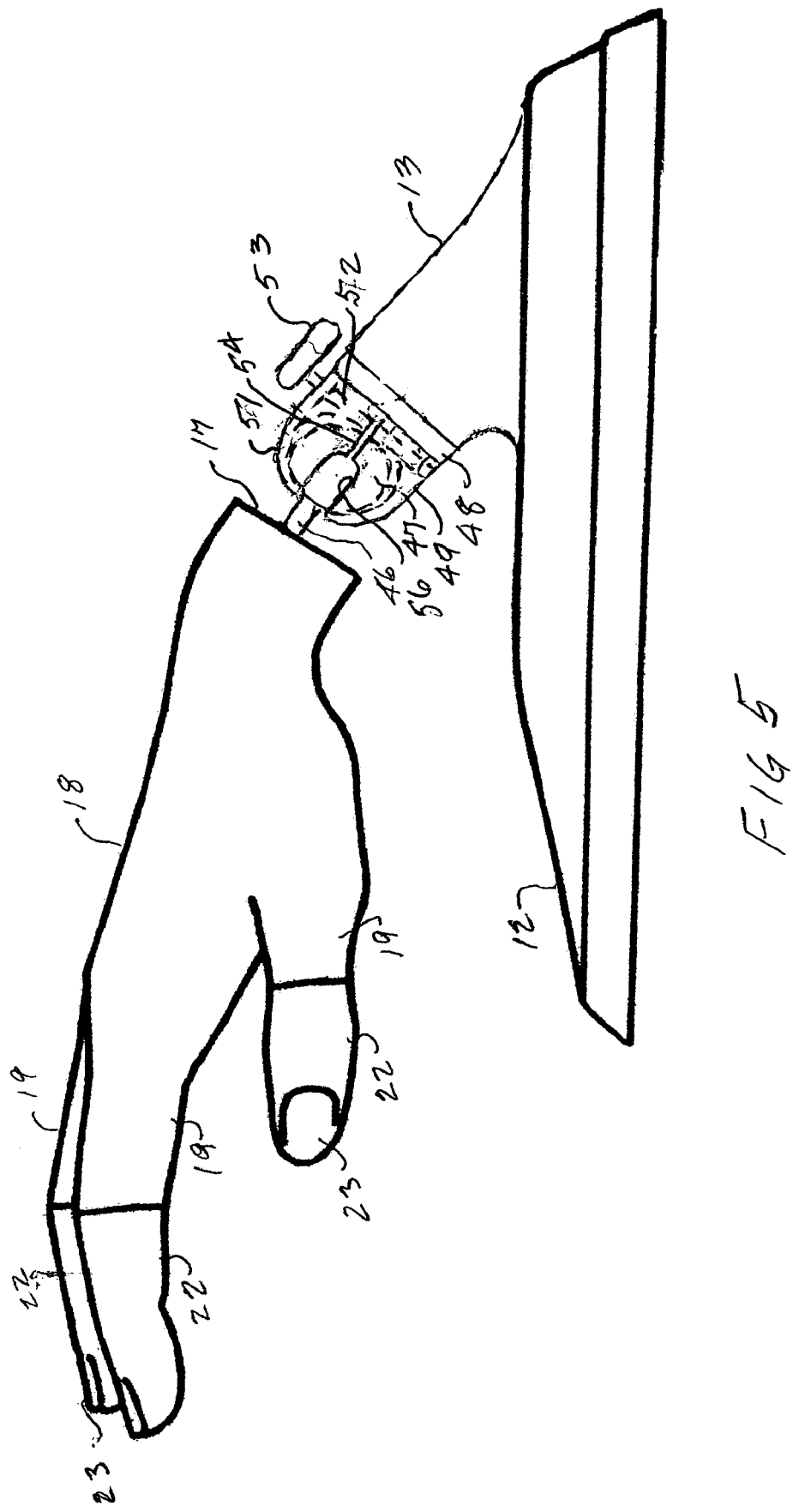
FIG. 5 is a side elevation view of still another embodiment of the invention

The embodiment of the invention shown in FIGS. 1 and 2 has a hand that is movable (rotatable) on one axis only, and the embodiment of FIGS. 3 and 4 has a hand that is movable on two discrete axes normal to each other. In FIG. 5 there is shown an embodiment of the invention in which the hand is movable to virtually any desired position.

In FIG. 5, the wrist end 17 of the hand 18 has extending therefrom a shaft 46 at the distal end of which is mounted a ball 47. Both shaft 46 and ball 47 are preferably made of metal or other hard material that is highly resistant to wear. Rotatably mounted to the end of holding member 13 is a socket support plate 48 from which extends a split socket member having first 49 and second 51 curved members which receive ball 47 therein. A locking member 52 is threaded in member 49 and has a locking/unlocking handle 53. When the ball is within the unlocked socket position, the hand can be moved to any desired position and then locked in that position by rotating handle 53 to pull the member 49 and 51 together. The split 54 which separates members 49 and 51 has an enlarged position 56 to allow clearance for shaft 46 as the hand is moved. Additionally, locking member 52 may be adjusted to allow movement of the hand bent to apply some restraining force to such movement approximate the resistance to movement of the human hand.

It is also possible for the socket member 49, 51 and support plate 48 to be mounted on the wrist end 17 and the shaft 46 and ball 47 extend from holding member 13.

It is to be understood that the various structural features of the present invention might be incorporated into other types of devices, and the other modifications or adaptations might occur to workers in the art. All such variations, modifications, or adaptations are intended to be included herein as being within the scope of the present invention as set forth. Further, in the claims hereafter, the corresponding structures, materials, acts and equivalents thereof are intended to include any structure, material, or acts for performing the functions in combination with other elements as specifically claimed.

The invention claimed is:

1. A training device assembly comprising:
   a base member;
   a holding member extending from said base member;
   an artificial hand pivotally mounted on said holding member;
   said hand having a wrist end and having partial fingers extending therefrom, said partial fingers having distal ends;
   a fingertip adapted to be removably mounted on at least one of said partial fingers, at the distal end thereof, each said fingertip having an artificial fingernail on the distal end thereof.

2. The training device assembly as claimed in claim 1 wherein said holding member extends from said base at an angle thereto and has a distal end and a bore extending into the member from said distal end; and
   said hand has a wrist end having a pin extending therefrom adapted to fit within said bore in a slip fit.

3. The training device assembly as claimed in claim 1 wherein said holding member comprises:
   a pivot pin that extends transverse to said holding member;
   a first and second spaced upstanding ears, each of said ears having a hole therein for receiving said pivot pin; and
   a wrist section having a first bracket extending therefrom and having openings therein for receiving said pivot pin, said hand being pivotal about the axis of said pivot pin, and pivotable relative to the wrist section.

4. The training device assembly as claimed in claim 3 wherein said wrist section has a bore therein and said hand has a pin insertable in said bore, said hand being pivotable about an axis defined by said pin and bore.

5. The training device assembly as claimed in claim 1 wherein said wrist end of said hand is connected to said holding member by a ball and socket joint.

6. The training device assembly as claimed in claim 5 wherein the ball and socket joint is lockable to hold the hand in a desired orientation.

7. The training device as claimed in claim 6 wherein the ball and socket joint comprises:
   a shaft extending from the wrist end of the hand;
   a spherical member mounted on a distal end of said shaft; and
   a split socket member mounted on a distal end of the holding member, said socket member having a partially spherical inner chamber for receiving said spherical member.

8. The training device assembly as claimed in claim 7 and further including a locking member adapted to pull a split portion of the socket member together to grip said ball.

9. The training device assembly as claimed in claim 8 and further including a socket support plate rotatably mounted on the distal end of said holding member.

10. The training device assembly as claimed in claim 1 wherein the material of said hand is foam rubber.

11. The training device assembly as claimed in claim 1 wherein the material of said hand is a polyurethane.

12. The training device assembly as claimed in claim 1 wherein the material of said hand is polyvinyl chloride.

13. The training device assembly as claimed in claim 1 wherein said base member has a bottom surface having a threaded bore therein.

14. The training device assembly as claimed in claim 1 wherein said base member is weighted.

15. The training device assembly as claimed in claim 1 wherein the material of said base member is a hard plastic.

* * * * *